(12) United States Patent
Thornton et al.

(10) Patent No.: US 7,387,267 B2
(45) Date of Patent: Jun. 17, 2008

(54) FOODSTUFF CRUSHING AND BLENDING APPARATUS

(75) Inventors: Andrew Thornton, Surrey (GB); Jamie Trevor Oliver, London (GB)

(73) Assignees: William Levene Limited (GB); Fresh Crush Limited (GB)

( * ) Notice: Subject to any disclaimer, the term of this patent is extended or adjusted under 35 U.S.C. 154(b) by 0 days.

(21) Appl. No.: 11/296,873

(22) Filed: Dec. 8, 2005

(65) Prior Publication Data

US 2006/0138263 A1 Jun. 29, 2006

(30) Foreign Application Priority Data

Dec. 24, 2004 (GB) .................................. 0428385.9

(51) Int. Cl.
*A47J 17/00* (2006.01)
(52) U.S. Cl. .................................. 241/168; 241/199.11
(58) Field of Classification Search ................ 241/179, 241/168, 199.11, 199, 199.1, 199.2, 199.21; 206/220, 63.5; 446/419; 84/402
See application file for complete search history.

(56) References Cited

U.S. PATENT DOCUMENTS

| 1,202,278 | A | * | 10/1916 | Feust ........................ 241/179 |
| 1,906,125 | A | * | 4/1933 | Kerr et al. ................... 122/478 |
| 3,139,180 | A | * | 6/1964 | Kobernick ................... 206/220 |
| 3,451,540 | A | * | 6/1969 | Kulischenko ............... 206/220 |
| 3,796,303 | A | * | 3/1974 | Allet-Coche ................ 206/220 |
| 4,182,447 | A | * | 1/1980 | Kay ........................... 206/220 |
| 4,450,957 | A | * | 5/1984 | Cohen ........................ 206/220 |
| 6,715,645 | B2 | * | 4/2004 | Peuker et al. ............... 222/129 |

FOREIGN PATENT DOCUMENTS

| EP | 0040182 | 11/1981 |
| GB | 1114807 | 5/1968 |
| GB | 2399518 | 9/2004 |

* cited by examiner

*Primary Examiner*—Faye Francis
(74) *Attorney, Agent, or Firm*—Lowe Hauptman Ham & Berner, LLP

(57) ABSTRACT

A foodstuff crusher/blender has a hollow body defining a closed elongate cavity. An access device, such as complementary screwthreads on respective ends of two portions of the body, enables the introduction and removal of foodstuff into and from the cavity. A crushing/blending ball is accommodated in the cavity. The cavity is of circular shape along its length in transverse cross-section. One end of the cavity is of substantially part-spherical shape with a diameter not substantially greater than that of the ball. The other end of the cavity is of substantially part-spherical shape with a diameter substantially greater than that of the ball. The diameter of the cavity increases progressively over at least a part of the distance between the two ends of the cavity.

13 Claims, 3 Drawing Sheets

FOODSTUFF CRUSHING AND BLENDING APPARATUS

FIELD OF THE INVENTION

The present invention relates to an apparatus for crushing and blending foodstuffs, in particular of hand-held type.

DESCRIPTION OF THE PRIOR ART

Historically, a pestle and mortar arrangement has been used for the crushing of foodstuff, as well as other materials such as pigments for the preparation of paints. While a simple design of a hard concave bowl in which foodstuff are crushed using a rounded pestle may be highly effective and has been in use for several thousand years, it has a number of drawbacks. For example the mortar and pestle arrangement requires either two handed operation or a mortar bowl fixed to a support surface. Furthermore, because of the open design of the mortar bowl, care has to be taken not to spill the bowl's contents during operation.

In published UK patent application GB 2 399 518 in the name of Freshcrush Limited, an attempt at overcoming the above-mentioned shortcomings of the traditional mortar and pestle is disclosed. The disclosed crushing arrangement comprises a cylindrical sealed container into which the foodstuff to be crushed is introduced together with a ball which can vary in size from 50% to 99% of the inner cross-sectional area of the container. The foodstuff inside the container is crushed by the ball as the container is vigorously shaken along its longitudinal axis. However, the arrangement of GB 2 399 518 still has a number of associated problems.

A first problem associated with the cylindrical shape of the cavity in the above-mentioned arrangement is the risk of jamming of the ball inside the cylinder, for example by accidentally wedging a peppercorn or grain between the inner wall of the container and the ball. Also, if liquid is introduced into the container or generated during crushing (for example a paste of crushed herbs) the formation of an airlock between the ball and the container may also result in jamming or at least impaired crushing performance. On the other hand, if the ball is made small enough to avoid the above-mentioned jamming problem, there is a decrease in crushing performance due to the small size of the ball as compared to the diameter of the cylindrical cavity. Thus, even if the bowl cross-section is tuned to optimise crushing for a particular foodstuff (for example, peppercorns) in a given cylindrical cavity, this may not be optimal for other types of foodstuff (for example herbs). Thus, while it may be possible to optimise crushing performance by choosing a particular ball diameter with respect to the diameter of the cavity, such a device may have a limited field of application.

Secondly, the prior arrangement discussed above has a limited functionality in the sense that it is designed only for crushing. In many cases it may be desirable to both crush and blend with a single kitchen utensil in order to prepare certain foodstuffs. If the arrangement of GB 2 399 518 is used, it is necessary to first crush and then use a second utensil for blending.

In accordance with the above, it is an object of the invention to provide an improved foodstuff crusher/blender which overcomes at least some of the problems of prior art crushers and provides a combined blender/crusher functionality.

SUMMARY OF THE INVENTION

According to the present invention, a crusher/blender has the features of claim 1. It preferably also has the features of one or more of the dependent claims.

In use, the ball and one or more foodstuffs are inserted into the cavity via the access means. The crusher/blender may then be manually shaken generally parallel to its length to cause the ball to oscillate along the length of the cavity, thereby crushing the foodstuffs, if solid. If the foodstuffs are, or include, a liquid or pasty substance, they will also be mixed or blended but more efficient blending may be achieved by an orbital motion of the crusher/blender causing the ball to rotate about the axis of the cavity on the portion of the substantially constant diameter. The progressively increasing diameter of at least a portion of the length of the cavity ensures that jamming of the ball, with solid foodstuffs, and hydraulic locking of the ball, with liquid or pasty foodstuffs, does not occur.

Whilst it is preferred that the body is constituted by portions provided with complementary screw threads some other fastening means, such as a bayonet connector, it may also be of one-part construction and the access means constituted by a portable or removable flap or hatch.

When sold, the ball may be within the cavity or outside it. For crushing purposes, the ball is preferably solid but for blending liquid or pasty foodstuffs, to make e.g. mayonnaise, it may be preferable for the ball to be hollow and provided with a number of holes in its wall. In order to permit the function of the crusher/blender to be varied at will it is therefore preferably provided with one ball of each type, which are used selectively in dependence on the task to be performed.

A specific embodiment of the invention will now be described by way of example only and with reference to the accompanying drawings.

DESCRIPTION OF THE PREFERRED EMBODIMENT

Figure 1:
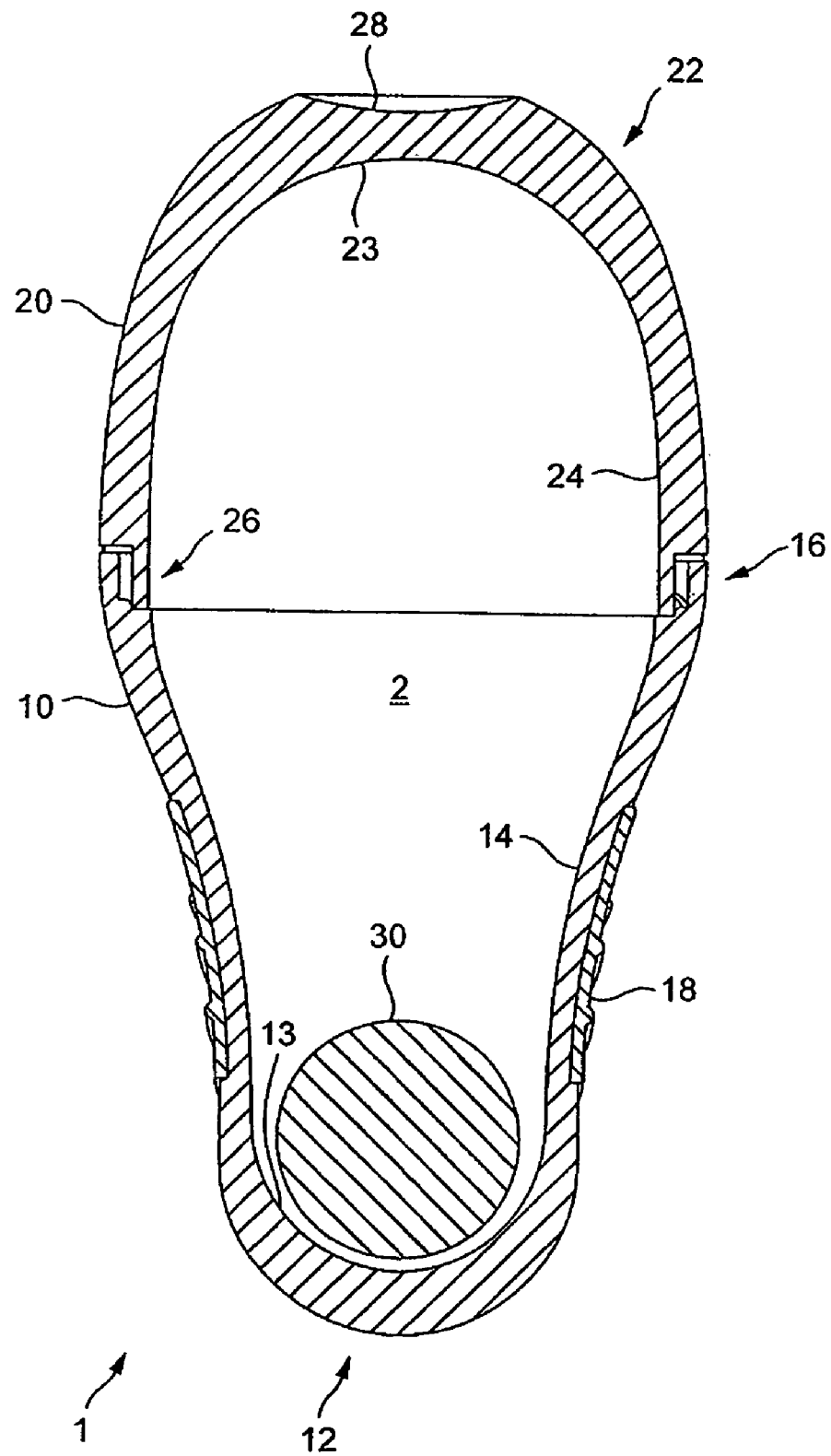
FIGS. 1 and 2 are axial sectional views of a combined crusher/blender in its two possible vertical orientations.
Figure 2:
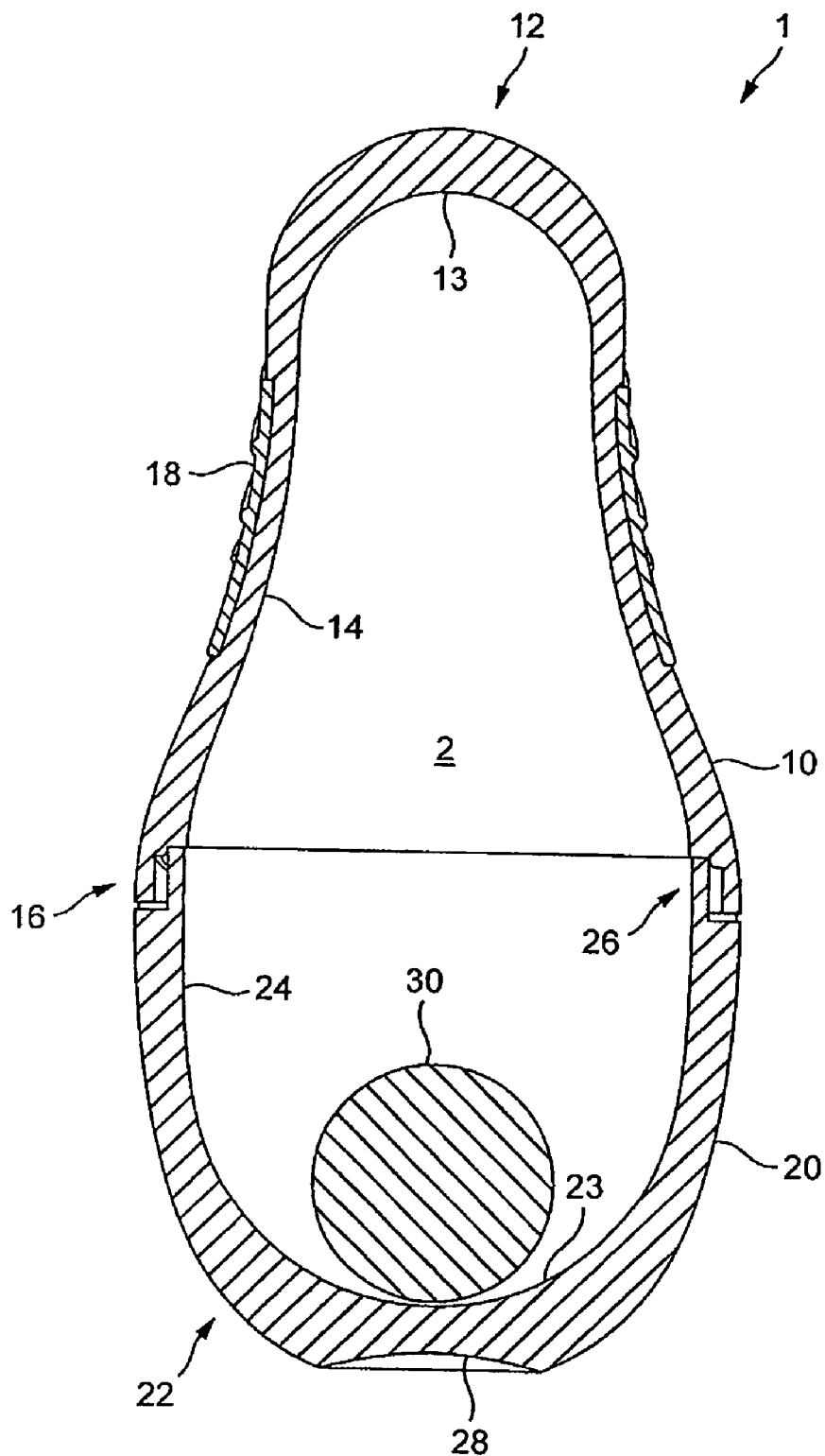
Figure 3:
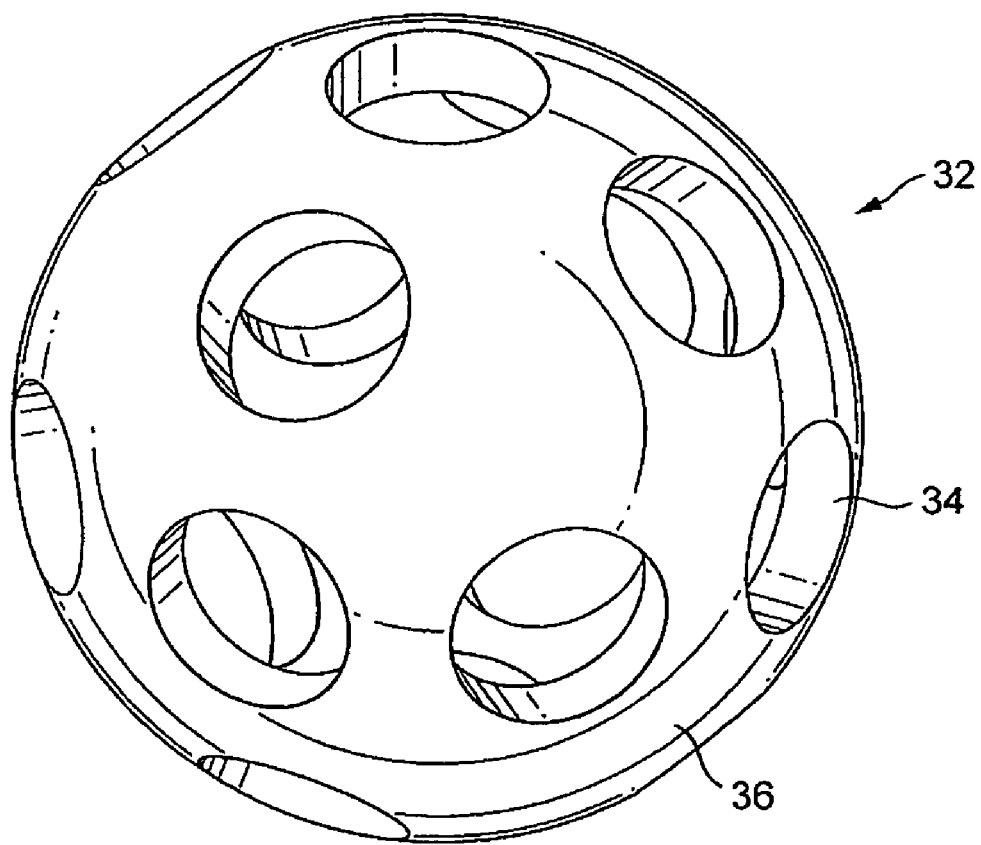
FIG. 3 shows an alternative embodiment of a blending ball for use with the embodiment of FIGS. 1 and 2.

With reference to FIGS. 1 and 2, the crusher/blender comprises a hollow body 1, generally in the shape of an avocado pear defining a similarly shaped closed elongate cavity of circular shape along its length in transverse cross-section. The body may be formed from metal, perspex, glass or any other suitably hard material.

Hollow body 1, comprises a first and a second body portion 10 and 20, having a respective closed end 12 and 22 and an open end 16 and 26 such that the closed ends 12, 22 define a longitudinal axis. Open ends 16 and 26 define cooperating fastening means that allow the two body portions to be fastened and sealed together such that their inner walls define the cavity 2. The fastening means comprises a complementary thread at each open end 16, 26 of the respective body portions 10, 20. Alternatively, the fastening means may comprise a bayonet—type fastener.

The first body portion 10 defines an external recess for accepting a grip portion 18. Grip portion 18, which may be glued or otherwise secured to the recess is made from a non-slip material, such as rubber, and provides a secure grip surface for holding the crusher/blender.

The second body portion 20, comprises a circular recess 28 on the outside of its closed end 22, enabling the hollow body 1 to stand upright on a flat surface (such as a table top), irrespective of the generally curved shape of its outer surface.

The inner walls of the body portions comprise respective first and second substantially part-spherical portions 13, 23 at their closed ends 12, 22 and a respective intermediate portion 14, 24 between the part-spherical portions 13, 23 and the respective open ends 16, 26.

The first part-spherical portion is arranged to have a diameter not substantially greater than that of a ball 30, (the function of which will be described below), but sufficiently large such that the ball 30 can contact the end of the cavity. The second part-spherical portion 23 is of a diameter substantially larger than the diameter of the ball 30 and the intermediate portions 14 and 24 are arranged such that the inner diameter of each body portion 10, 20 is the same at their respective open end 16, 26.

In the specific embodiment, the first intermediate portion 14 has a curved shape in axial cross section such that the diameter of cavity 2 increases progressively from the first part-spherical portion 13 to the open end 16 whilst the second intermediate portion 24 extends substantially straight from the second part-spherical portion 23 to the open end 26 such that the diameter of the cavity 2 is substantially constant between the part-spherical portion 23 and the open end 26. The diameter of the cavity 2 thus increases progressively from the first end 12 to the junction of the two body portions and then remains substantially constant before decreasing to the second end 22 of the hollow body 1.

In operation, foodstuff to be crushed or blended is introduced into one of the first or second body portions 10 or 20, together with ball 30. The cavity 2 is then sealed by attaching the other body portion to the one containing the foodstuff and ball using the fastening means. The fastening means, first body portion 10 and second body portion 20 thus provide access means enabling the introduction and removal of foodstuff into and from the cavity 2.

Advantageously, once the cavity is sealed by fastening the two body portions together, the crusher/blender can be operated in one of two modes. In a crushing mode of operation, the first end 12 is held downwards below the second end 22. The foodstuff inside cavity 2 is then crushed between the ball 30 and the part-spherical portion 13 by agitating the crusher/blender up-and downwards substantially along the longitudinal axis, such that the ball 30 moves between the positions shown in FIGS. 1 and 2.

In a blending mode of operation, the crusher/blender is held such that the second end 22 is below the first end 12, possibly with some degree of inclination with respect to the direction of gravity. A blending action is achieved by, for example, a swivelling motion of the crusher/blender such that the ball 30 follows a substantially circular path inside cavity 2 around its longitudinal axis. Of course, the two modes of operation can be combined or can be carried out one after the other for a combined crushing and blending action.

Following sufficient crushing and/or blending, the foodstuff can be removed by separating the two body portions, providing access to the processed foodstuff through one of open ends 16 or 26.

In addition to providing both a crushing and a blending mode, the avocado shape of the crusher/blender housing with its first, narrow end 12 used for crushing and a second, wide end 22 used for blending eliminates or at least reduces the problem of the ball becoming jammed inside the cavity due to foodstuff being wedged between the ball and the cavity (or due to an air lock) during a crushing mode of operation. This advantageous result is due to the funnel shape of part of the cavity extending between the first and second part-spherical portions. At the second, wide end 22 of the cavity, the large diameter means that the ball does not get jammed, while the narrowing funnel shape of the cavity towards the first, end 12 guides the ball into alignment with the first, narrow end 12 for an effective crushing action.

The ball 30 can be constructed in a variety of alternative ways suitable for both the crushing and blending modes of operation. For example, the ball may be formed as a solid or hollow body from any suitable material such as glass, perspex or metal, as long as the ball is sufficiently hard and heavy to provide an efficient crushing operation.

In an alternative embodiment 32 of the ball 30, particular suitable for the blending mode of operation, the ball 32 comprises a hollow sphere 36 enclosing a central cavity, the sphere 36, comprising an array of holes 34 providing a fluidic communication path between the central cavity and the medium surrounding the sphere 36. Advantageously, the particular geometry of the alternative ball 32, provides for a more vigorous blending action as agitation of the crusher/blender forces the foodstuff into and out of the central cavity through the holes 34, thus providing an additional intermingling action further improving blending performance.

While the invention has been described with reference to a specific embodiment, various modifications of the specific embodiment will be apparent to persons skilled in the art.

The invention claimed is:

1. A foodstuff crusher/blender comprising;
a hollow body defining a closed elongate cavity;
access means enabling the introduction and removal of foodstuff into and from said cavity; and
a crushing/blending ball for accommodation in said cavity;
said body comprising a first body portion having a first open end and a first closed end a second body portion having second open end and a second closed end, whereby foodstuff may be removed into and from said body portions through said open ends;
said access means including fastening means enabling said two body portions to be fastened together to form said closed elongate cavity;
wherein said cavity has a circular shape along its length in transverse cross section, said first closed end being of substantially part-spherical shape with a diameter not substantially greater than that of said ball and said second closed end being of substantially part-spherical shape forming a part-spherical closed end with a diameter substantially greater than that of said ball, the diameter of said cavity increasing progressively from said part-spherical first closed end to said first open end and being substantially constant from said part-spherical second closed end to said second open end and being the same at the two said open ends.

2. The foodstuff crusher/blender as claimed in claim 1, wherein said fastening means comprise respective complementary thread portions on said open ends of said body portions or a bayonet closure.

3. The foodstuff crusher/blender as claimed in claim 1, wherein said fastening means comprise a bayonet connector.

4. A foodstuff crusher/blender as claimed in claim 1, wherein said hollow body comprises an outer surface defining a recess and a grip portion secured within said recess, said grip portion comprising a non-slip material.

5. The foodstuff crusher/blender as claimed in claim 1, wherein the outer surface of said hollow body defines a recess adjacent to the said second end of said elongate cavity, said recess enabling said foodstuff crusher/blender to stand upright on a flat surface.

6. The foodstuff crusher/blender as claimed in claim 1, wherein the diameter of said cavity is substantially constant over a portion of its length adjacent to said second end.

7. The foodstuff crusher/blender as claimed in claim 1 wherein said ball is solid.

8. The foodstuff crusher/blender as claimed in claim 1 wherein said ball is hollow.

9. The foodstuff crusher/blender as claimed in claim 8, wherein said ball comprises a plurality of holes providing a fluid communication path between the hollow interior of said ball and a surrounding medium.

10. The foodstuff crusher/blender as claimed in claim 8 additionally including a further ball which is solid.

11. The foodstuff crusher/blender as claimed in claim 9, additionally including a further ball which is solid.

12. The foodstuff crusher/blender as claimed in claim 1, wherein each of the first and second body portions are one piece.

13. The foodstuff crusher/blender as claimed in claim 1, wherein said elongate cavity has a smooth, contiguous surface.

* * * * *